United States Patent
Ben-Yehuda et al.

(10) Patent No.: US 8,521,919 B2
(45) Date of Patent: Aug. 27, 2013

(54) DIRECT MEMORY ACCESS IN A COMPUTING ENVIRONMENT

(75) Inventors: Shmuel Ben-Yehuda, Haifa (IL); Leah Shalev, Haifa (IL); Orit Luba Wasserman, Haifa (IL); Ben-Ami Yassour, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/494,274

(22) Filed: Jun. 30, 2009

(65) Prior Publication Data

US 2010/0332693 A1    Dec. 30, 2010

(51) Int. Cl.
*G06F 13/28* (2006.01)

(52) U.S. Cl.
USPC .............................. 710/22; 710/28

(58) Field of Classification Search
None
See application file for complete search history.

(56) References Cited

U.S. PATENT DOCUMENTS

| | | | | |
|---|---|---|---|---|
| 5,031,090 A | * | 7/1991 | Banach et al. | 709/202 |
| 5,150,463 A | * | 9/1992 | Ward et al. | 709/217 |
| 5,808,911 A | * | 9/1998 | Tucker et al. | 719/316 |
| 6,112,286 A | | 8/2000 | Schimmel et al. | |
| 6,496,871 B1 | * | 12/2002 | Jagannathan et al. | 719/317 |
| 7,266,556 B1 | * | 9/2007 | Coates | 1/1 |
| 7,334,076 B2 | * | 2/2008 | Hendel et al. | 711/6 |
| 7,340,506 B2 | * | 3/2008 | Arunachalam | 709/219 |
| 7,356,665 B2 | | 4/2008 | Rawson, III | |
| 7,383,412 B1 | | 6/2008 | Diard | |
| 7,464,191 B2 | * | 12/2008 | Arndt et al. | 710/10 |
| 7,500,048 B1 | * | 3/2009 | Venkitachalam et al. | 711/6 |
| 7,613,847 B2 | * | 11/2009 | Kjos et al. | 710/22 |
| 7,647,414 B2 | * | 1/2010 | Fan | 709/230 |
| 7,788,464 B2 | * | 8/2010 | Sheu et al. | 711/207 |
| 2008/0005495 A1 | | 1/2008 | Lowe et al. | |

OTHER PUBLICATIONS

Paul Mackerras, Title: Re: how to get virtual address from dma address, 2001. Source: http://www.ussg.iu.edu/hypermail/linux/kernel/0110.0/1222.html.

* cited by examiner

*Primary Examiner* — Kris Rhu
(74) *Attorney, Agent, or Firm* — Jason Far-hadian

(57) ABSTRACT

A method of address translation in a computing system providing direct memory access (DMA) by way of one or more remote memory management units (MMUs) is provided. The method comprises intercepting a request for a first DMA operation forwarded by a first device to a second device; and translating a guest address included in the request to a first address according to a mapping referencing a memory frame in a memory of the second device. A local MMU increments a first reference count indicating number of active DMA operations directed to the memory frame and a second reference count indicating number of remote MMUs that have mapped the memory frame.

8 Claims, 7 Drawing Sheets

DIRECT MEMORY ACCESS IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to memory management in a computing environment and, more particularly, to managing direct memory access in a computing environment.

BACKGROUND

A direct memory access (DMA) operation generally allows certain hardware components within a computing system to access system memory for reading and/or writing independently of a central processing unit (CPU). Such hardware components may include disk drive controllers, graphics cards, network cards, sound cards, and other CPUs.

In the context of virtualization, a DMA operation allows one or more guests to directly access the memory of a host. Such guests may include hardware components as provided above and software components such as virtual machines (VMs). Such a host may be a CPU as provided above or a software component such as a hypervisor.

Typically, a guest may initiate a DMA operation by forwarding a request comprising a guest address referencing a location in a guest memory address space. A remote memory management unit (MMU) intercepts the request and translates the guest address to a host address referencing a memory frame in a host memory address space.

In one implementation, memory frames in the host memory address space are mapped in advance. Unfortunately, since the guest is permitted to access memory frames that are mapped, such an implementation can lead to a less secure host memory address space for the host device. Such an implementation can also be inefficient in terms of memory allocation because mapped memory frames are pinned, or made unavailable to other devices, to prevent data corruption.

In another implementation, memory frames in the host memory address space are mapped only during DMA operations. A memory frame is mapped in response to receiving a request for a DMA operation and unmapped in response to completing the DMA operation. Unfortunately, such an implementation is inefficient in terms of performance if consecutive DMA operations are performed on one or more same memory frames.

If a memory frame is mapped by more than one MMU, the memory frame cannot be freed, or unpinned, until the memory frame is unmapped by each MMU. Completely unmapping the memory frame requires locating and removing each mapping that references the memory frame. Unfortunately, existing implementations scan the entire guest memory address space for each guest device to complete the unmapping process. Such an implementation negatively impacts system performance.

SUMMARY

The present disclosure is directed to systems and corresponding methods that facilitate managing direct memory access in a computer environment.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method of address translation in a computing system providing DMA by way of one or more remote MMUs is provided. The method comprises intercepting a request for a first DMA operation forwarded by a first device to a second device; and translating a guest address included in the request to a first address according to a mapping referencing a memory frame in a memory of the second device. A local MMU increments a first reference count indicating number of active DMA operations directed to the memory frame and a second reference count indicating number of remote MMUs that have mapped the memory frame.

In accordance with one embodiment, a method of freeing memory in a computing system providing DMA by way of one or more remote MMUs is provided. The method comprises determining whether a memory frame is a target of any active DMA operation; determining whether the memory frame is mapped by any entity that is not a remote MMU; and unmapping the memory frame, in response to determining that the memory frame is neither a target of any active DMA operation nor mapped by any entity that is not a remote MMU.

In accordance with one embodiment, a method of managing memory consumption in a computing system providing DMA by way of one or more remote MMUs is provided. The method comprises defining a memory quota for a first remote MMU; monitoring amount of memory consumed by the first remote MMU; and freeing a memory frame mapped by the first remote MMU, in response to detecting that the first remote MMU is about to exceed the memory quota.

In accordance with one embodiment, a method of transferring management of memory in a computing system providing DMA by way of one or more remote MMUs is provided. The method comprises identifying a memory frame that is not a target of any active DMA operation; determining whether any remote MMU is using the memory frame; and prohibiting other entities from managing the memory frame, in response to determining that at least one remote MMU is using the memory frame.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
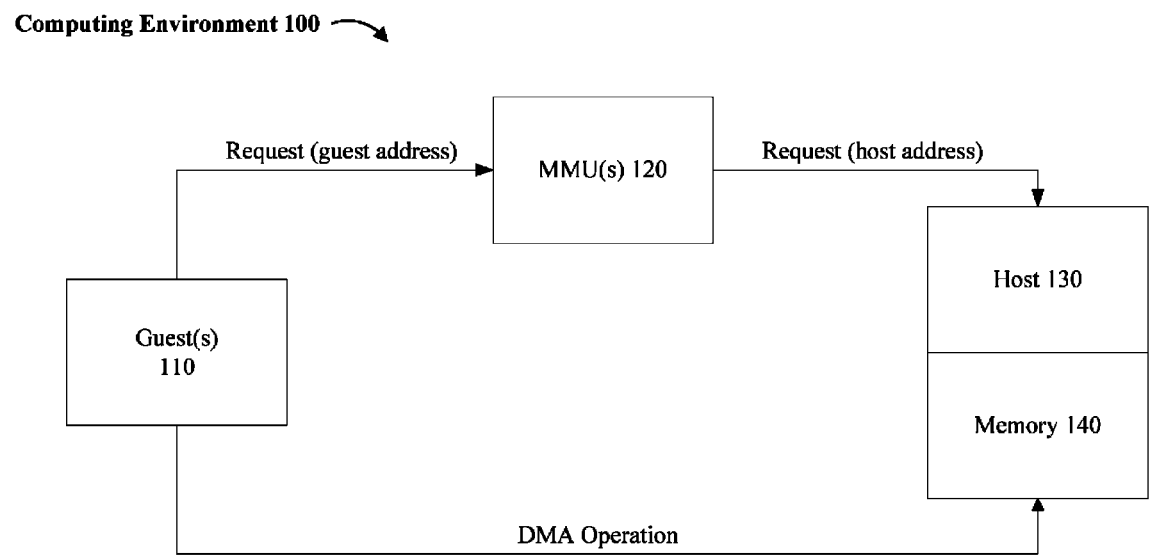
FIG. 1 illustrates an exemplary computing environment implemented to support DMA operations, in accordance with one or more embodiments.

Referring to FIG. 1, in accordance with one embodiment, an exemplary computing environment 100 comprises one or more guests 110, one or more remote MMUs 120, a host 130, and a memory 140. Each guest 110 may be configured to initiate a DMA operation on the memory 140 by forwarding a request comprising a guest address to the host 130.

A remote MMU 120, as used herein, refers to a software or hardware component (e.g., an operating system, a hypervisor, a controller, an I/O MMU) that is configured to manage a memory address space of a guest 110. In one implementation, each remote MMU 120 maintains a data structure (e.g., a translation table) that provides a mapping in response to receiving a guest address in a guest memory address space as a key. A mapping, as used herein, refers to a relationship that associates a guest address in a guest address memory space with a host address of a memory frame in the memory 140.

Figure 2:
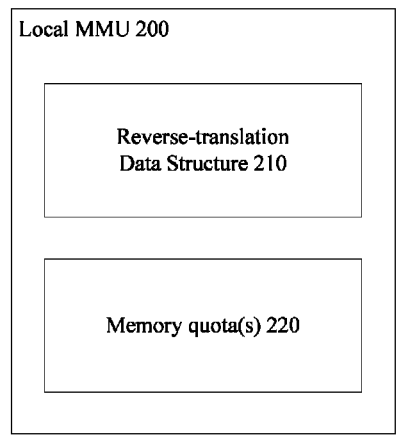
FIG. 2 illustrates an exemplary local MMU, in accordance with one embodiment.

The host 130 may be configured to execute one or more local MMUs. A local MMU, as used herein, refers to a software component (e.g., an operating system, a hypervisor, a controller) that is configured to manage the memory 140. Referring to FIGS. 1 and 2, in accordance with one embodiment, an exemplary local MMU 200 maintains a reverse-translation data structure 210 that provides one or more mappings in response to receiving a host address as a key. It is noteworthy that the reverse-translation data structure 210 may provide mappings created by entities other than the remote MMUs 120. The local MMU 200 also defines a memory quota 220 for each remote MMU 120 to manage memory consumption.

Figure 3:
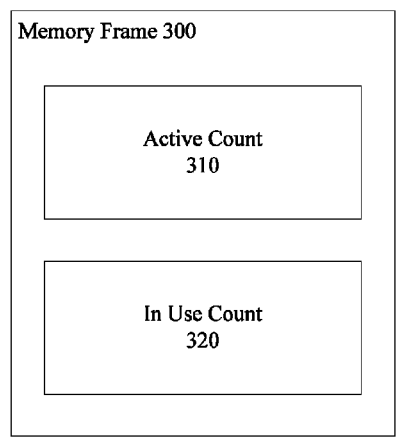
FIG. 3 illustrates an exemplary memory frame, in accordance with one embodiment.

The memory 140 is coupled to the host 130 and comprises one or more memory frames. Referring to FIGS. 1 and 3, in accordance with one embodiment, an exemplary memory frame 300 is associated with an active reference count 310 indicating the number of active DMA operations directed to the memory frame 300 and an in use reference count 320 indicating the number of MMUs 120 that have mapped the memory frame 300.

Figure 4:
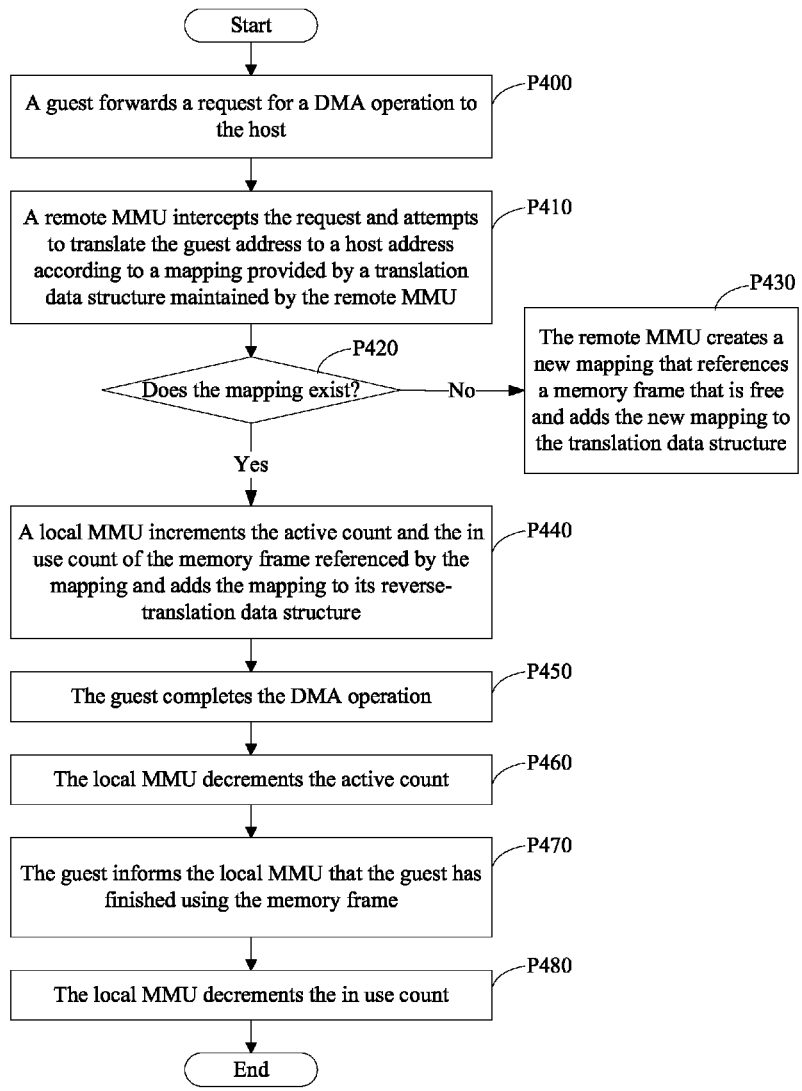
FIG. 4 is a flow diagram of a method for address translation, in accordance with one embodiment.

Referring to FIGS. 1 and 4, in accordance with one embodiment, a guest 110 forwards a request for a DMA operation to the host 130 (P400). A remote MMU 120 managing the guest memory address space of the guest 110 intercepts the request and attempts to translate the guest address included in the request to a host address according to a mapping provided by its translation data structure (410). If the mapping does not exist (P420), the remote MMU 120 creates a new mapping that references a memory frame that is free, or unmapped, and adds the new mapping to the translation data structure (P430).

Once the guest address is translated or a new mapping is created, a local MMU increments the active count and the in use count of the memory frame and adds the mapping to its reverse-translation data structure (P440). Once the DMA operation is completed (P450), the local MMU decrements the active count of the memory frame (P460). The mapping is maintained at least until the guest 110 informs the local MMU that the guest 110 has finished using the memory frame (P470), and the local MMU decrements the in use count of the memory frame (P480).

Advantageously, this persistent mapping scheme improves performance by allowing the same mapping to be used for subsequent DMA operations directed to the memory frame. Since the mapping remains valid, no flushing (e.g., invalidation of an entry in a cache) is performed if there is a translation cache (e.g., a translation look-aside buffer).

Figure 5:
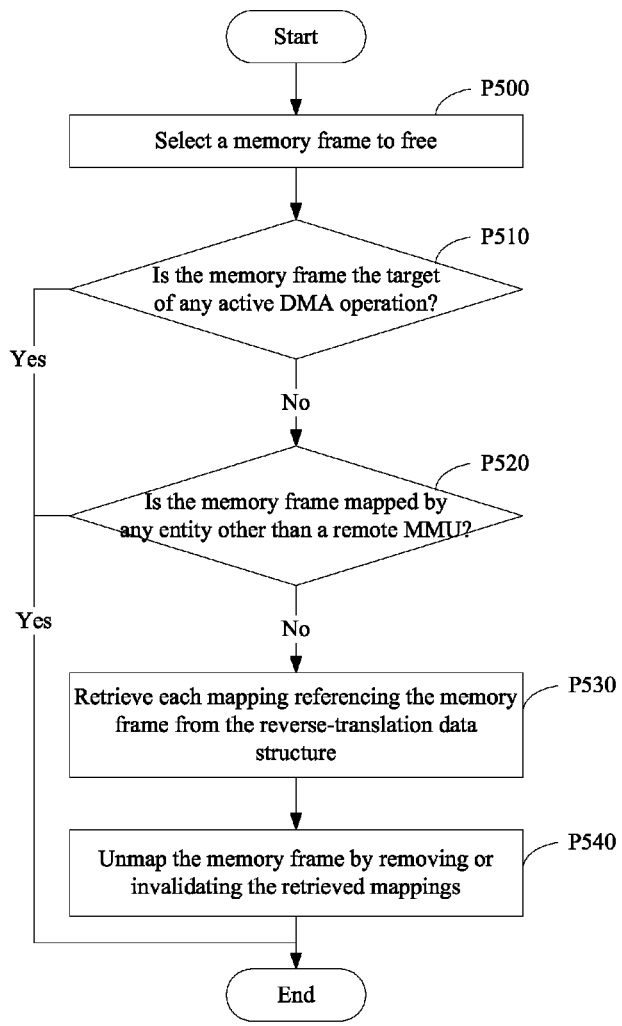
FIG. 5 is a flow diagram of a method for freeing a memory frame, in accordance with one embodiment.

Referring to FIGS. 1 and 5, in accordance with one embodiment, a local MMU selects a memory frame to free, in response to memory pressure, virtual machine page flipping, or other factor that may cause the memory frame to be reused (P500). To avoid data corruption, the local MMU determines whether the memory frame is the target of any active DMA operation (P510) or is mapped by any entity other than the remote MMUs 120 (P520).

The memory frame is the target of at least one active DMA operations, if its active count is not zero. The memory frame is mapped by at least one entity that is not one of the remote MMUs 120, if its in use count is less than the number of mappings referencing the memory frame, which are retrieved from the reverse-translation data structure maintained by the local MMU (P530).

Upon finding a memory frame that is neither the target of any active DMA operation nor mapped by any entity other than the remote MMUs 120, the local MMU unmaps the memory frame by removing or invalidating the retrieved mappings (P540). Advantageously, the reverse-translation data structure allows the local MMU to quickly and efficiently unmap the memory frame without scanning the entire guest memory address space of each of the guests 110.

Figure 6:
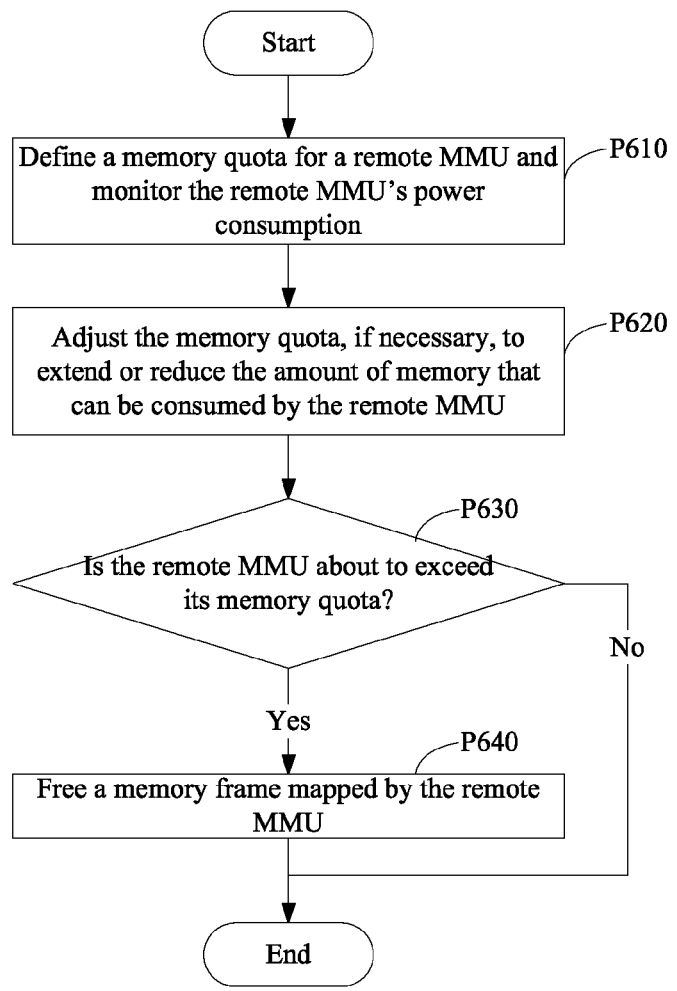
FIG. 6 is a flow diagram of a method for managing memory consumption of a remote MMU, in accordance with one embodiment.

Referring to FIGS. 1 and 6, in accordance with one embodiment, a local MMU defines a memory quota for a remote MMU 120 and monitors the remote MMU 120's memory consumption (P400). The memory quota may be adjusted, desirably, to extend or reduce the amount of memory that can be consumed by the remote MMU 120 (P410). If the local MMU detects that the remote MMU 120 is about to exceed its memory quota (P420), the local MMU frees a memory frame mapped by the remote MMU 120 (P430).

Figure 7:
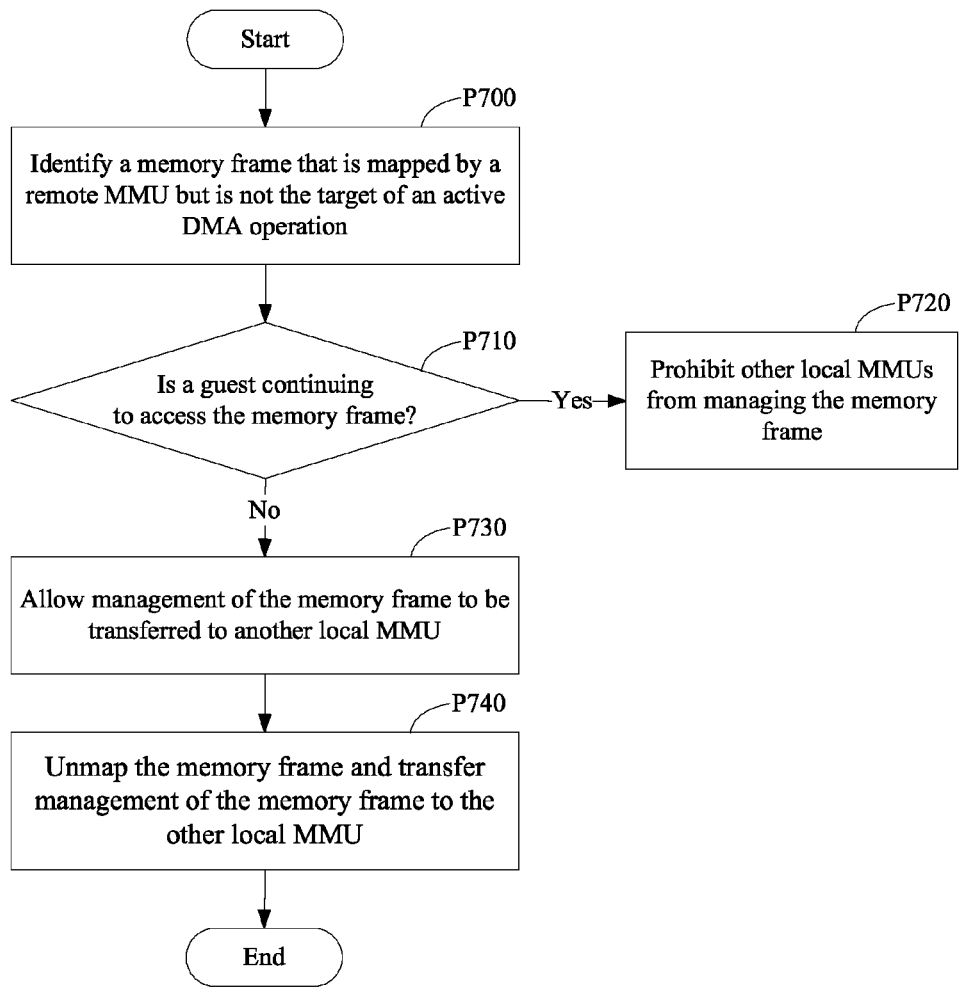
FIG. 7 is a flow diagram of a method for transferring management of a memory frame, in accordance with one embodiment.

Referring to FIGS. 1 and 7, in accordance with one embodiment, a local MMU identifies a memory frame that is mapped by a remote MMU 120 but is not the target of an active DMA operation (i.e., the active count of the memory frame is zero) (P700). Upon identifying the memory frame, the local MMU determines whether a guest 110 whose guest memory address space is managed by the remote MMU 120 may continue to access the memory frame (i.e., the in use count of the memory frame is greater than zero) (P710). If so, other local MMUs are prohibited from managing the memory frame 132 (P720).

Otherwise, another local MMU may be allowed to manage the memory frame (P730). If so, the local MMU unmaps the memory frame and transfers management of the memory frame to the other local MMU (P740). Advantageously, this shared mapping scheme provides memory protection while sustaining the performance of persistent mapping, as provided earlier.

In different embodiments, the claimed subject matter may be implemented either entirely in the form of hardware or entirely in the form of software, or a combination of both hardware and software elements. For example, computing environment 100 may comprise a controlled computing system environment that can be presented largely in terms of hardware components and software code executed to perform processes that achieve the results contemplated by the system of the claimed subject matter.

Figure 8:
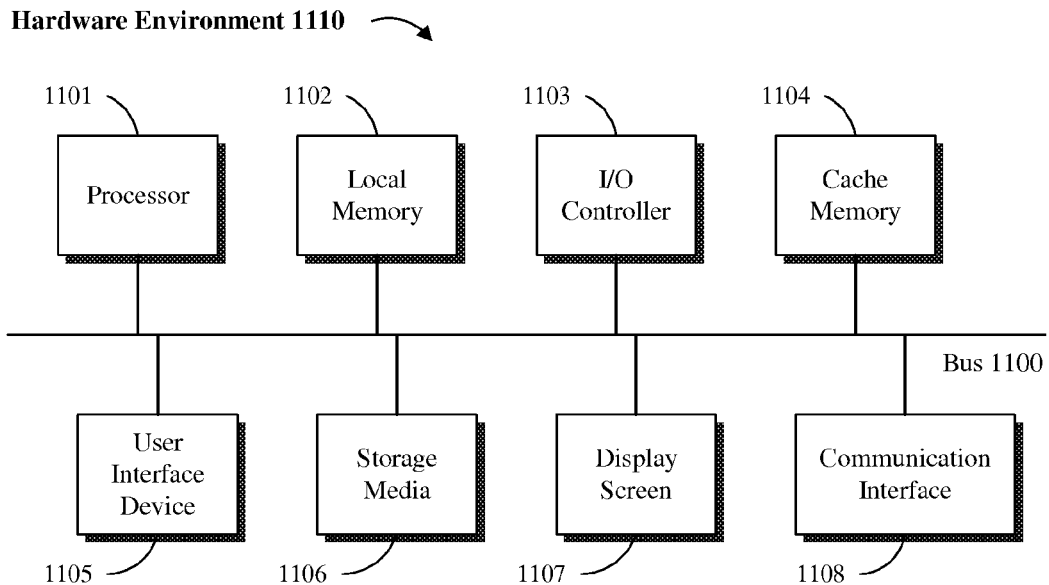
FIGS. 8 and 9 are block diagrams of hardware and software environments in which a system of the present invention may operate, in accordance with one or more embodiments.
Figure 9:
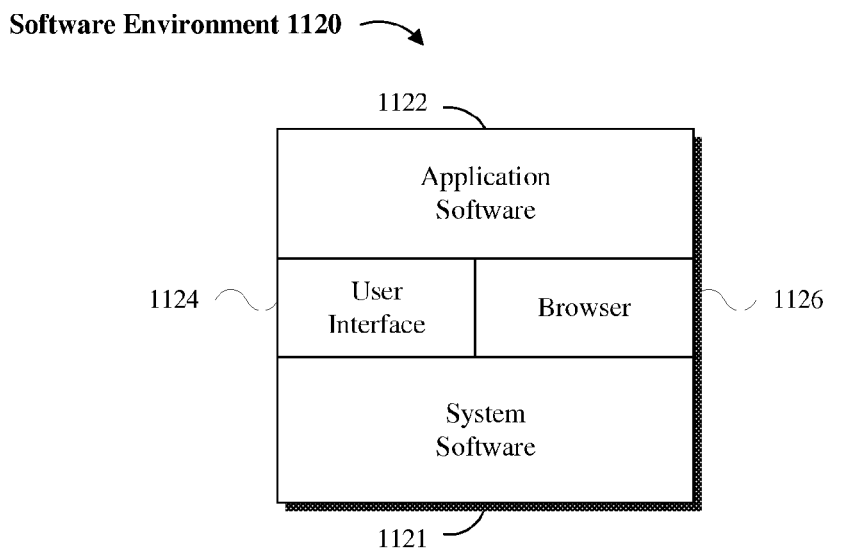

Referring to FIGS. 1, 8, and 9, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In one embodiment, a remote MMU 120 or a local MMU is implemented as application software 1122 executed on one or more hardware environments to manage DMA in the computing system 100. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 8, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 9, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on computing system 100 and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. An address management method comprising:
   intercepting a direct memory access (DMA) request submitted by a guest device to access a memory frame on a host device, wherein the DMA request comprises a guest memory address; and
   translating the guest memory address in the DMA request to a host memory address according to a mapping scheme using the guest memory address as a key to reference a host memory frame in a memory of the host device,
   wherein the host memory frame is associated with a first reference count indicating number of active DMA requests directed to the host memory frame by one or more guest devices,
   wherein the host memory frame is associated with a second reference count indicating number of mappings referencing the host memory frame according to said mapping scheme,
   wherein a memory management unit (MMU) increments the first reference count, in response to intercepting additional DMA request to access the host memory frame, and
   wherein the MMU increments the second reference count, in response to intercepting DMA requests by additional guest devices to access the same host memory frame.

2. The method of claim 1, further comprising creating a new mapping to a host memory frame for an intercepted DMA request, in response to determining that the mapping does not exist for the guest memory address in the DMA request.

3. The method of claim 2, further comprising adding the new mapping to a data structure that maintains an association between the guest address in the DMA request and the corresponding host memory frame.

4. The method of claim 3, wherein the MMU adds the new mapping to the data structure.

5. The method of claim 1, wherein the MMU decrements the first reference count, in response to the guest device completing a DMA operation associated with the DMA request.

6. The method of claim 1, wherein the guest device informs the MMU, in response to completing use of the host memory frame.

7. The method of claim 6, wherein the MMU decrements the second reference count, in response to being informed that the guest device has completed using the host memory frame.

8. The method of claim 1, further comprising unmapping and transferring management of the host memory frame to another entity, in response to determining that no guests are using the host memory frame.

* * * * *